United States Patent [19] [11] 3,725,595
Mechanic-Esfahani [45] Apr. 3, 1973

[54] ELECTRONIC CONVERSION AND SECRECY APPARATUS

[76] Inventor: Bahram Mechanic-Esfahani, 154 Neshat St., Teheran, Iran

[22] Filed: Mar. 2, 1971

[21] Appl. No.: 120,224

[52] U.S. Cl. ....179/17 B, 179/175.2 C
[51] Int. Cl. ....H04m 3/56
[58] Field of Search ....179/1.5, 17 B

[56] References Cited

UNITED STATES PATENTS

| | | | |
|---|---|---|---|
| 2,994,742 | 8/1961 | Lomax | 179/17 B |
| 1,850,192 | 3/1932 | Willis | 179/17 B |
| 3,100,244 | 8/1963 | King et al. | 179/17 B |
| 3,499,121 | 3/1970 | McIntosh et al. | 179/17 B |
| 3,514,544 | 5/1970 | Chambers, Jr. | 179/17 B |

*Primary Examiner*—Benjamin A. Borchelt
*Assistant Examiner*—H. A. Birmiel
*Attorney*—Pranel, Wilson & Matthews

[57] ABSTRACT

An apparatus is disclosed which is inserted into a telephone party line to convert such party line into a private line in response to a telephone call involving a party in the party line and provide secrecy to such call and prevent interference and eavesdropping with a completed call by other parties in the party line.

11 Claims, 4 Drawing Figures

Bahram Mechanic-Esfahani
INVENTOR

BY

Pravel Wilson & Matthews
ATTORNEYS

Bahram Mechanic-Estahani
INVENTOR

BY

Prael Wilson & Matthews
ATTORNEYS

Bahram Mechanic-Esfahani
INVENTOR

BY

Pravel Wilson & Matthews
ATTORNEYS

ELECTRONIC CONVERSION AND SECRECY APPARATUS

BACKGROUND OF THE INVENTION

1. Field of the Invention

The present invention relates to electronic party line conversion and secrecy apparatus for telephones.

2. Description of the Prior Art

In the prior art, such as my Iranian Pat. No. 8,000, apparatus was disclosed which attempted to solve the problem occurring when individual parties or subscribers to telephone party line service desire private or exclusive line service but the necessary private telephone lines and equipment for private line service are not available. Such prior art apparatus was often bulky, cumbersome and expensive. Further, the prior art apparatus did not prevent interference with the incoming call by other parties of the party line, such as by eavesdropping, by answering of the incoming call, or by attempting to dial an outgoing call while the party line was in use. Further, the prior art apparatus were susceptible to noise and other interference on the telephone line.

SUMMARY OF THE INVENTION

Briefly, the present invention provides an apparatus for converting telephone party line service into private or exclusive line service by connecting the telephone of a predetermined called party to an incoming call for such party, and excluding other parties of the party line from such call. The apparatus responds to a selection signal in the incoming call and connects the telephone of the called party to the calling party, thereby protecting telephone calls from interference and providing secrecy from eavesdropping by other parties to the party line. Further, the apparatus protects outgoing calls from parties of the party line from eavesdropping and interference.

It is an object of the present invention to provide a new and improved electronic conversion and secrecy apparatus.

It is an object of the present invention to provide a new and improved telephone conversion apparatus for converting telephone party line service into private or exclusive line service.

It is an object of the present invention to provide a new and improved telephone secrecy apparatus for providing secrecy for a telephone call to a party having a telephone party line service.

DESCRIPTION OF THE PREFERRED EMBODIMENT

Figure 1:
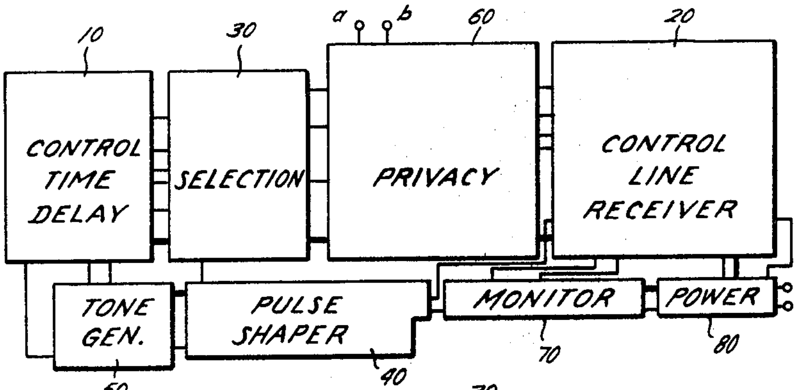
FIG. 1 is a schematic block diagram of the apparatus of the present invention.
Figure 3:
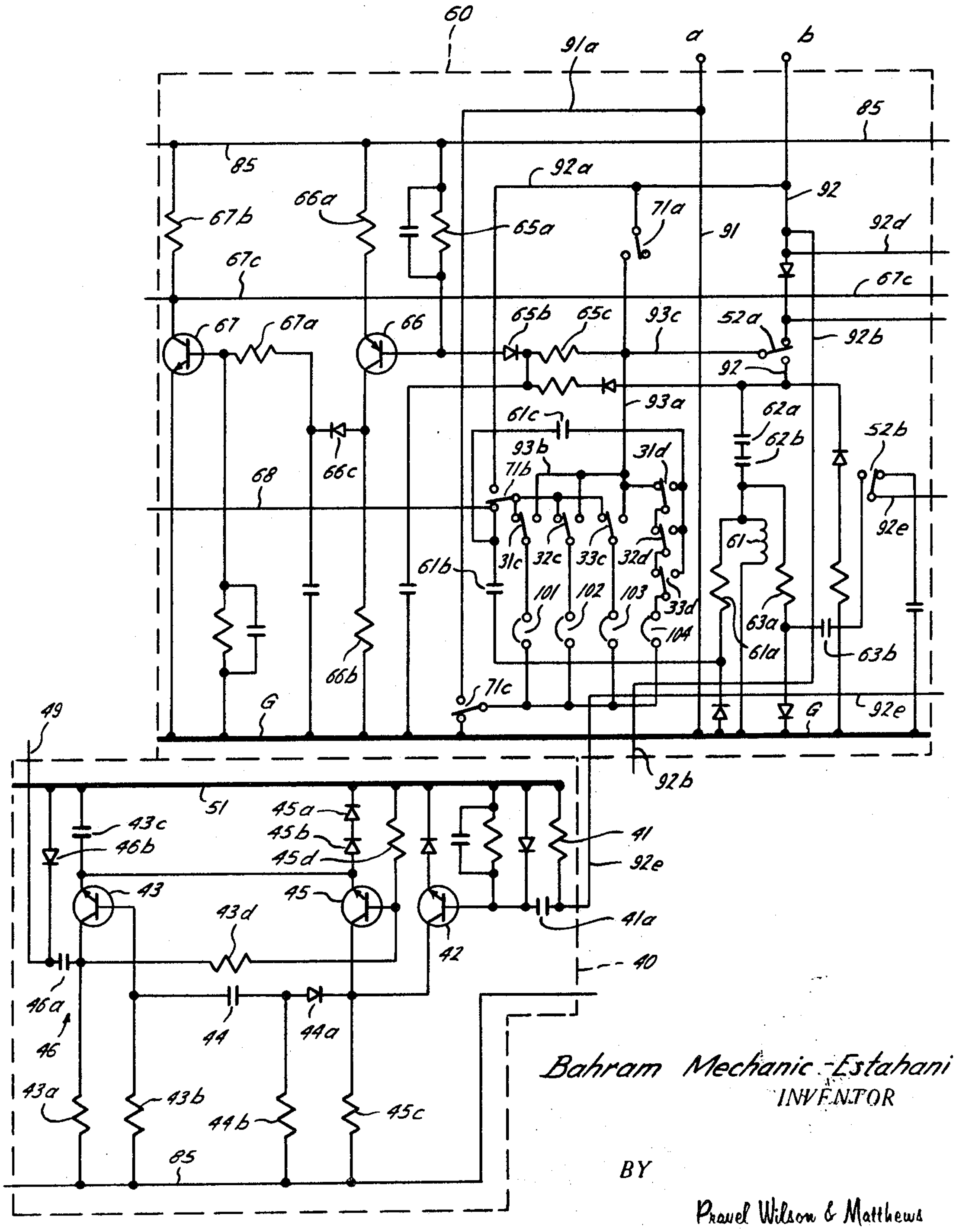
FIG. 3 is a schematic electrical circuit diagram of a portion of the apparatus of FIG. 1.

In the drawings, the letter A designates generally the apparatus of the present invention which is inserted into a telephone party line providing party line service to a plurality of telephone parties or subscribers each having a telephone 101, 102, 103 and 104 (FIG. 3) respectively, connected in parallel and sharing a telephone line electrically connected to a pair of input conductors 91 and 92 (FIG. 1 and 3). The apparatus A furnishes private or exclusive line service to the individual subscribers so that a subscriber may use the telephone line to the exclusion of each of the other parties on the party line in a like manner to a telephone subscriber having exclusive or private line service. The exclusive line service afforded by the apparatus A of the present invention is provided in response to incoming calls as well as outgoing calls placed by the subscribers to the party line. When the apparatus operates in response to an incoming call, as will be more evident later, the incoming caller transmits an additional selection signal of dial pulses to specify the subscriber 101 through 104 with whom he wishes to speak.

Figure 2:
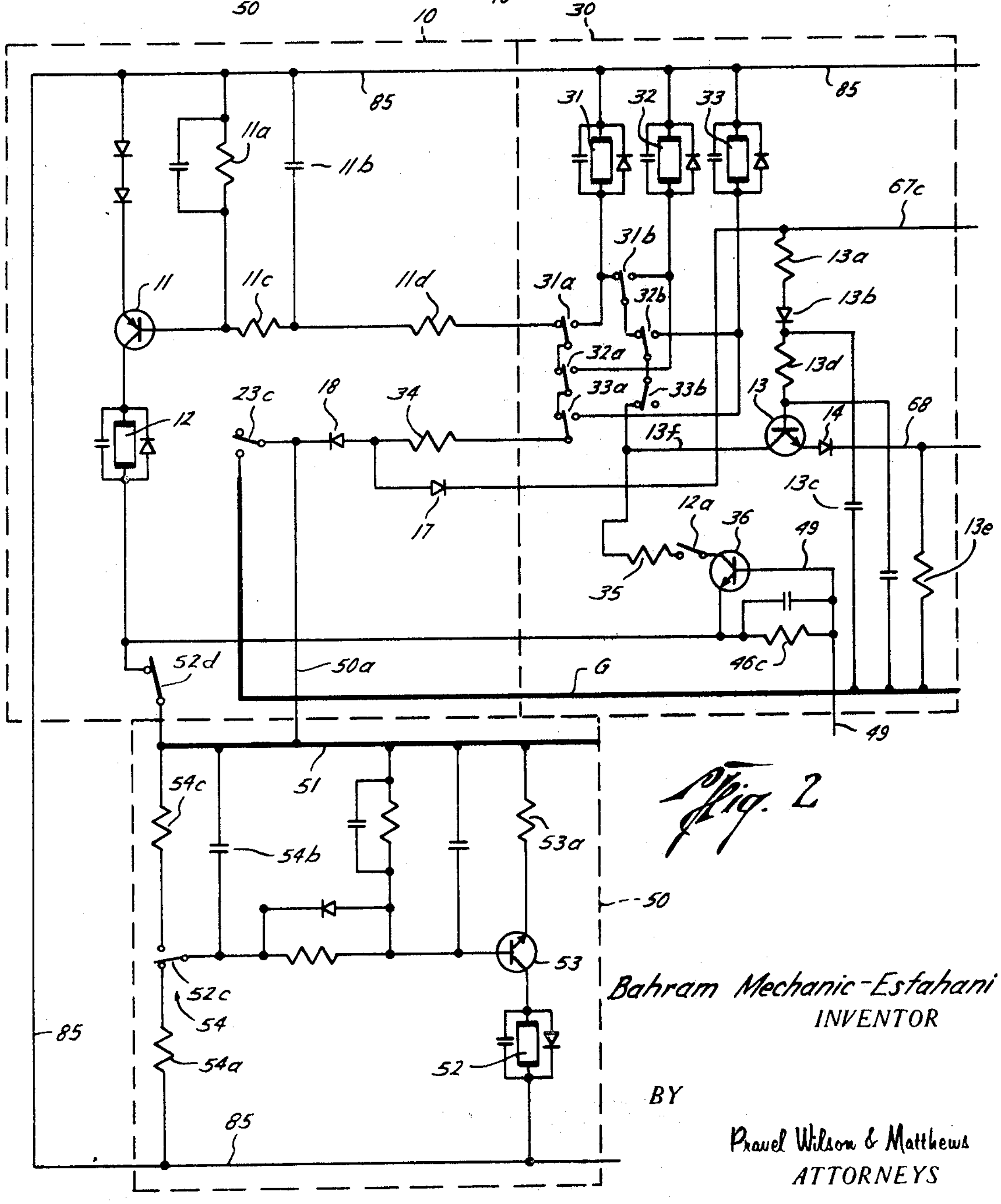
FIG. 2 is a schematic electrical circuit diagram of a portion of the apparatus of FIG. 1.

The apparatus A includes a control circuit C, a selection circuit S, a tone generator circuit T, a privacy circuit P, a power supply circuit B and a monitor circuit M. The circuit components and connections of the control circuit C are illustrated generally in the accompanying drawings as a line receiver circuit 20 (FIG. 4) and a time delay circuit 10 (FIG. 2). The components and circuitry of the selection circuit S are illustrated as a selection circuit 30 (FIG. 2) and a pulse shaper circuit 40 (FIG. 3). The circuitry and connections of the tone generator T, the privacy means P, the monitor M and the power supply B are illustrated generally as 50, 60, 70 and 80, respectively, in the accompanying drawings.

A primary transformer coil 81 (FIG. 4) of the power supply B is electrically connected at a pair of input terminals **81*a* and 81*b* to a wall socket or other suitable source of alternating current electric power and receives power therefrom. A fuse 81*c* is electrically connected to the transformer coil 81 and protects such coil from excess currents. A secondary coil 82 receives a portion of the alternating current power from the primary coil 81 and furnishes such alternating current power to a full wave rectifier arrangement of diodes 82*a* which rectifies the alternating current received by the secondary coil 82 and furnishes a rectified output signal to a smoothing capacitor 82*b*. The smoothing capacitor 82*b* removes any undesirable ripple or fluctuation in the direct current output of the rectifier 82*a*, and provides a positive potential at a terminal 82*c* with respect to a ground conductor or bus bar G. A fuse 82*d* is electrically connected between the terminal 82*c* and a voltage stabilizing circuit 83** to protect the circuit components of the apparatus A from surges or unexpected transients or increases in the output of the power supply B.

The voltage stabilizing circuit 83 includes a Zener diode **83*a*, a transistor 83*b*, a capacitor 83*c*, and a resistor 83*d* which provide an output of 24 volts at a very low impedance level. The impedance values of the capacitor 83*c* and the resistor 83*d* are chosen in order to bias the Zener diode 83*a* to its operating region wherein substantially constant output current is provided despite input fluctuations. Thus, a substantially constant output is furnished through the transistor 83*b* across an output capacitor 83*e* between a positive power supply conductor 85** and the ground bus bar G.

The positive power supply conductor 85 is electrically connected to each of the circuits of the apparatus A and furnishes positive operating bias potential to the components of such circuits.

The telephone sets 101, 102, 103 and 104 (FIG. 3) of the telephone party line subscribers who are provided with private or exclusive line service by the apparatus A are electrically connected in a parallel arrangement to the input conductors 91 and 92 by a plurality of conductors 91*a* and 92*a*, respectively. A plurality of contacts 71*a*, 71*b* and 71*c* (FIG. 3) of a control relay 71 (FIG. 4) of the monitor circuit M electrically connect the telephone sets 101 through 104 (FIG. 3) to the conductors 91*a* and 92*a* to return the telephone instruments to a party line service arrangement in the event of a power failure in the power supply B or in the event that it is desired to return the subscribers to a party line service arrangement for other reasons. The contact 71*a*, 71*b*, and 71*c* are illustrated (FIG. 3) in the energized position they assume when the relay 71 (FIG. 4) in the monitor circuit M is receiving electrical power from the power supply B. When the relay 71 is energized the telephone sets 101 through 104 (FIG. 3) are not connected in the normal party line service arrangement, as will be more evident hereinbelow.

The monitor circuit M (FIG. 4) serves the function of returning the telephones 101 through 104 (FIG. 3) to a party line service arrangement should the power furnished to the power supply B (FIG. 4) fail, or should a failure occur in the components of the power supply B, in order to maintain telephone service to the subscribers in the event of such power failure. The monitor M also serves the function of providing compatibility with the testing equipment in the telephone exchange by providing an electrical circuit of like performance characteristics to a party line arrangement, thereby making the apparatus A of the present invention compatible with testing equipment in a telephone exchange or office.

When the power supply B is providing positive bias power over the power supply conductor 85, a base input terminal 72*b* of a transistor 72 receives sufficient current through a bias resistor 72*a* to energize the transistor 72. When the transistor 72 is energized, current flows from the positive power supply conductor 85 through a resistor 72*c*, the transistor 72, the relay 71 and a resistor 72*e*, energizing the relay 71 moving the contact 71*a*, 71*b*, 71*c* and 71*d* (FIG. 3) to the positions illustrated in the accompanying drawings. With the contacts of the relay 71 in the position shown in the accompanying drawings, the apparatus A of the present invention is energized and prepared to convert party line telephone service into private or exclusive line service, as will be more evident hereinbelow.

In the event of a failure of the power supply, the power supply conductor 85 (FIG. 4) no longer supplies power to the apparatus A. the transistor 72 no longer receives current through the resistor 72*a* at its input 72*b*, and the transistor 72 no longer conducts, blocking the flow of current through the relay 71. When the relay 71 no longer receives current, the contacts 71*a*, 71*b*, 71*c*, and 71*d* (FIG. 3) move to the alternate or rest position and return the telephone instruments 101 through 104 into a party line service arrangement, thereby permitting continued telephone service in the event of a power failure.

When the relay 71 (FIG. 4) no longer receives current, the contacts 71*b* and 71*c* (FIG. 3) of the relay 71 connect the telephone instruments 101 through 103 to the conductors 91*a* and 92*a* and through such conductors to the input conductors 91 and 92, placing the telephone instruments 101 through 103 in an electrical parallel circuit arrangement between the input conductors 91 and 92. The telephone instrument 104 is electrically connected between the electrical conductors 91*a* and 92*a* by the contacts 71*a* and 71*c*, placing such telephone instrument 104 in a parallel circuit arrangement with the telephone instruments 101 through 103, thereby returning the telephone instruments into a parallel or party line service arrangement in the event of a power failure of the power supply 80 (FIG. 4) or of the alternating current power supply furnishing the power supply 80 with input power through the primary coil 81.

When a test voltage is furnished from a telephone testing office over telephone lines to the input conductors 91 and 92 (FIG. 3) of the apparatus A, such voltage is furnished to the power supply monitor 70 (FIG. 4) over the input conductor 92*b*. The voltage appearing at the input conductor 92*b* (FIGS. 3 and 4) is furnished through a capacitor 73*a* (FIG. 4), a diode 73*b*, and a resistor 73*c* to an input terminal 73*d* of a transistor 73. The transistor 73 upon receipt of the test pulse from the input conductor 92*b* biases the base 72*b* of the transistor 72 to cut off the flow of current in the relay 71, returning the contacts of the relay 71 to the alternate position from that illustrated in the accompanying drawings, returning the telephone instruments 101 through 104 (FIG. 3) to a party line service arrangement as has been previously set forth hereinabove. Subsequently, the testing equipment at the telephone central office may perform the necessary tests on the telephone instruments 101 through 104 while the monitor 70 (FIG. 4) is holding the telephone instruments 101 through 104 (FIG. 3) in a party line service arrangement, thereby rendering the apparatus A compatible with testing equipment in the telephone exchange.

Figure 4:
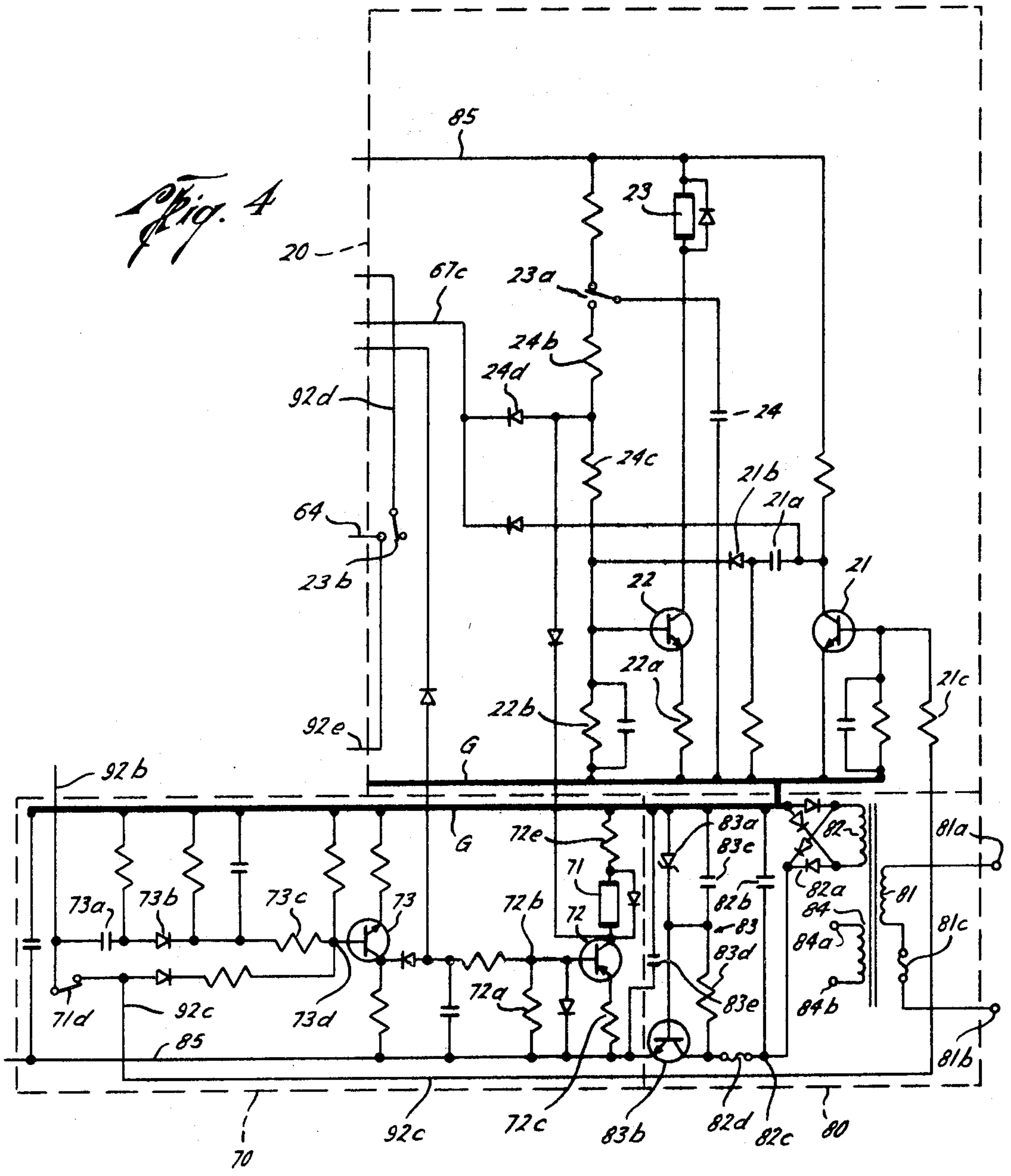
FIG. 4 is a schematic electrical circuit diagram of the remainder of the apparatus of FIG. 1.

The control circuit C includes a time delay circuit 10 (FIG. 2) and a line receiver circuit 20 (FIG. 4). The input transistor 21 of the line receiver circuit 20 is electrically connected by the current limiting input resistor 21*c* and the input conductor 92*c* through the contact 71*d* of the relay 71 to the input conductor 92*b*. When the relay 71 is not receiving current, the contact 71*d* moves to the alternate position from the position shown in the accompanying drawings, preventing the input conductor 92*c* from conveying current through the input resistor 21*a* to the input transistor 21, preventing the line receiver circuit 20 from initiating operation of the apparatus A as will be more evident hereinafter.

An electrical conductor 92*b* connects the input terminal 92 to a contact 71*d* of the relay 71 in the monitor circuit M (FIG. 4). The contact 71*d* is illustrated in the drawings in the energized position it assumes when the relay 71 is receiving power from the power supply B. An electrical conductor 92*c* connects the output of the contact 71*d* to the current limiting resistor 21*c* in the control circuit C (FIG. 4). The contact 71*d* permits an incoming ringing signal of an incoming call appearing on the input terminals 91 and 92 to pass through the conductor 92*c* to an input transistor 21 in the control circuit C when the relay 71 is receiving current.

When the relay 71 receives current, the ringing signal of an incoming call is conducted to the input transistor 21 by the conductors 92, 92*b*, the contact 71*d*, the conductor 92*c* and the resistor 21*a*. Such incoming ringing signal energizes the transistor 21 and is conducted through a capacitor 21*a* and a diode 21*b* to the base of a transistor 22, turning on the transistor 22. When the transistor 22 is turned on, current flows from the positive power supply conductor 85 through the relay 23, the transistor 22 and a resistor 22*a* to the ground conductor G energizing the relay 23. A latch contact 23*a* of the relay 23 closes a time delay circuit including a resistor 24*b*, a resistor 24*c*, a bias resistor 22*a* of the transistor 22, and a capacitor 24.

When the contact 23*a* closes, the transistor 22 is held latched or biased into operation until the capacitor 24 discharges sufficiently to stop the flow of current through the resistors 24*b*, 24*c* and 22*a*. During the time that the transistor 22 is latched into operation, the relay 23 is receiving current from the transistor 22. When the capacitor 24 is discharged sufficiently to stop the flow of current through the resistors 24*b*, 24*c* and 22*a*, the transistor 22 is cut off, terminating the flow of electrical current through the coil of the relay 23, de-energizing the apparatus A.

The resistance values of the resistors 24*b*, 24*c* and 22*a*, and the capacitance value of the capacitor 24 are chosen such that the time that is required for the capacitor 24 to be discharged is a suitable time for connection of the telephone instrument101 through 104 (FIG. 3), as the case may be, to the incoming call. The latch contact 23*a* (FIG. 4) of the relay 23 returns to the position illustrated in the accompanying drawings when the time delay circuit de-energizes the transistor 22 as set forth hereinabove, preventing subsequent energization of the relay 23 until receipt of subsequent incoming ringing signals of a new telephone call to a preselected party on the party line.

The contacts 23*b* and 23*c* of the relay 23 close when the relay 23 is energized and electrically connects a load resistor 41 (FIG. 3) between the input conductors 91 and 92 over the following circuit: the input conductor 91 (FIG. 3); the ground conductor G (FIGS. 2 and 3); the contact 23*c* (FIG. 2); a ground return conductor 50*a*, which electrically connects the ground conductor G to a ground 51 in the tone generator circuit 50 and the pulse shaping circuit 40 (FIG. 3); the resistor 41, and input conductor 92*e*, the contact 23*b* (FIG. 4) and input conductor 92*d*, and the input conductor 92 (FIG. 3). Connection of the resistor 41 to the input conductors 91 and 92 over the previously set forth circuit permit a direct current voltage on the telephone lines to cause a current of sufficient magnitude, in this embodiment approximately 32 milliamperes, to flow through the input conductors 91 and 92, providing a return current after receipt of the incoming ringing signal in order to control switching equipment at the telephone exchange, which switching equipment drops out upon completion of the call in the well known manner.

The time delay circuit 10 of the control circuit C (FIG. 2) includes a transistor 11 and a relay 12 which operate to electrically connect the pulse shaper circuit 40 (FIG. 3) to the selection circuit 30 (FIG. 2) in order to permit the selection signal furnished by the incoming caller to control a plurality of selection relays, 31, 32, 33 and select the desired party on the party line called by the incoming caller.

The time delay circuit 10 includes a resistor 11*a*, a capacitor 11*b*, a resistor 11*c*, a resistor 11*d* which are electrically connected through a contact 31*a* of the relay 31, a contact 32*a* of the relay 32, a contact 33*a* of the relay 33 of the selection circuit 30 (FIG. 2) and a resistor 34 in the selection circuit 30 to ground when the contact 23*c* closes. The impedance values of the circuit elements of the time delay circuit 10 are chosen such that after the passage of a predetermined period of time, in this embodiment 300 milliseconds, the transistor 11 begins conducting, permitting current to flow through the coil of the relay 12. The contact 12*a* (FIG. 2) of the relay 12 closes when the relay 12 receives current from the transistor 11, and electrically connects the pulse shaper circuit 40 (FIG. 3) to the selection circuit 30 over an output conductor 49 (FIGS. 2 and 3) through a control transistor 36 (FIG. 2). The closed contact 12*a* and a resistor 35 connect transistor 36 to the selection relays 31, 32, and 33 in the selection circuit 30 (FIG. 2). Incoming pulses of the train of pulses of the selection signal furnished by the calling party appear at the input conductors 91 and (FIG. 3) 92 and are conducted to the resistor 41 by the conductors 92*d*, the closed contact 23*b* and the conductor 92*e*. The incoming pulses on the conductor 92*e* pass through a capacitor 41*a* to the base of an amplifying transistor 42 which amplifies the incoming input pulses appearing across the resistor 41 between the input conductor 92*e* and the ground conductor 51.

The amplified input pulses appearing at the collector of the amplifying transistor 42 are furnished to the base of a transistor 43 through a capacitor 44. The transistor 43 and a transistor 45 are electrically connected in a collector-coupled monostable multivibrator circuit including resistors 43*a* and 43*b*, capacitor 43*c*, resistor 43*d*, diodes 44*a*, 45*a* and 45*b* and resistors 44*b*, 45*c*, and 45*d*. The monostable multivibrator circuit of the transistors 43 and 45 furnishes uniform amplitude output pulses of uniform duration for each input pulse from the amplifying transistor 42 and re-shapes the incoming pulses of the selection signal to protect the apparatus from noise and static and other undesirable electrical and electronic interference present on the telephone line to thereby insure accurate and prompt operation of the selection circuit 30 (FIG. 3).

An output pulse shaping circuit 46 (FIG. 3) including a capacitor 46*a* connected to the collector of the transistor 43, an output diode 46*b* electrically connected between the capacitor 46*a* and the ground conductor 51 (FIGS. 2 and 3), and a resistor 46*c* (FIG. 2) electrically connected between the conductor 49 and the emitter of the control transistor 36 in the selection circuit 30 (FIG. 2) receives the uniform width and amplitude output pulses from the collector-coupled monostable multivibrator and provides pulses to the base of the transistor 36.

The pulse shaping circuit 46 (FIG. 3) decreases the abruptness of transition between levels of the pulse output of the pulse shaper 40 and furnishes such pulses to the transistor 36. The pulses of the transistor 36 are conducted from the collector of transistor 36 through the closed contact 12*a* of the relay 12 and an output resistor 35 and through a contact 33*b* of the selection relay 33, a contact 32*b* of the selection relay 32 and a contact 31*b* of the selection relay 31 to the selection relay 31. Each of the selection relays 31, 32, and 33 control the connection of a corresponding telephone instrument 101, 102, and 103 (FIG. 3), respectively.

The telephone instrument 101 is electrically connected between the contact 71*b* and 71*c* of the relay 71 by its contact 31*c* *when the relay 31 is not receiving electrical current. When the relay 31 receives electrical current, the telephone instrument 101 is electrically connected between the input conductors 91 and 92 in an exclusive line service arrangement permitting the user of the telephone instrument 101 to converse with an incoming caller and providing privacy and secrecy of the call from the other parties to the party line.*

The first pulse of the incoming train of pulses of the selection signal, after being shaped in the pulse shaper circuit 40 and passing through the transistor 36, energizes the relay 31 over the following circuit: closed contact 12*a*, resistor 35, contact 33*b*, contact 32*b*, contact 31*b*, relay 31, and positive power supply conductor 85. Upon energization of the relay 31, the contact 31*a*, the contact 31*b*, a contact 31*c* (FIG. 3) and a contact 31*d* (FIG. 3) move to an opposite position from that illustrated in the accompanying drawings. The contact 31*a* (FIG. 3) connects the relay 31 between the positive power supply conductor and the ground conductor G at this time over the following circuit: contact 31*a*, contact 32*a*, contact 33*a*, resistor 34, diode 18, and closed contact 23*c*, thereby holding the relay 31 energized. When only one pulse is present in the incoming pulse train of selection signals, the relay 31 will receive such pulse, and the relays 32 and 33 will receive no pulse. When the relay 31 is energized, the contact 31*c* (FIG. 3) electrically connects the telephone instrument 101 which is controlled by the selection relay 31 in the following electrical circuit between the input conductors 91 and 92: input conductor 91, closed contact 71*c*, telephone instrument 101, closed contact 31*c*, a common conductor 93*b*, a return conductor 93*a*, and a return conductor 93*c*, through a ring return contact 52*a* of a ring control relay 52 (FIG. 2) in the tone generator circuit 50 (FIG. 2).

When a second pulse is present in the selection signal, the relay 32 (FIG. 2) receives the second pulse and is energized by such pulse over the following circuit: the transistor 36; closed contact 12*a;* resistor 35; contact 33*b;* contact 32*b;* a closed contact 31*b* energized by the relay 31 in response to the first pulse, as set forth above, relay 32 and positive power supply conductor 85.

When the relay 32 receives the second pulse of the incoming selection signal, the contact 32*a* moves to an opposite position from that illustrated in the accompanying drawings, preventing further current flow through the relay 31 and providing a connection through the relay 32 for the current from the positive power supply conductor 85 through the contact 32*a*, the contact 33*a*, the resistor 34, the diode 18 and the closed contact 23*c* to the ground conductor G. A contact 32*c* of the relay 32 also moves to an opposite position from that illustrated in the accompanying drawings, and electrically connects the telephone instrument 102 (FIG. 3) between the contact 71*c* and the contact 52*a* through the conductors 93*b*, 93*a* and 93*c*, thereby inserting the telephone instrument of the predetermined party selected by two input pulses in the incoming pulse train of the selection signal between the input conductors 91 and 92.

When a third pulse is present in the incoming pulse train of the selection signal, such pulse is conducted through the closed contact 12*a* (FIG. 2), the resistor 35, the contact 33*b*, a contact 32*b* of the relay 32 which is closed in response to the second input pulse energizing the relay 32, and the relay 33. The relay 33 is energized by the third incoming pulse, moving the contact 33*a* thereof to a position opposite that illustrated in the accompanying drawings, and preventing the selection relays 31 and 32 from receiving further current. The contact 33*a* electrically connects the relay 33 between the positive power supply conductor 85 and the ground conductor G through the resistor 34, the diode 18 and the closed contact 23*c*. The contact 33*c* (FIG. 3) of the relay 33 electrically connects the telephone instrument 103 (FIG. 3) of the party selected by three pulses in the incoming selection signal between the incoming conductors 91 and 92 over the contact 71*c*, the telephone instrument 103, the closed contact 33*c* the conductor 93*a*, the conductor 93*c* and the contact 52*a*.

The contact 33*b* (FIG. 2) of the relay 33 moves to an opposite position from that illustrated in the accompanying drawings when the relay 33 receives current and prevents subsequent pulses in the incoming pulse train from energizing the selection relays 31, 32 and 33. Should an incoming pulse train of more than three pulses be received, the telephone instrument 103 representing the party selected by three pulses in an incoming pulse train selection signal will be electrically connected between the input conductors 91 and 92 over the circuit set forth hereinabove.

It should be understood that the number of selection relays set forth in this embodiment, namely three, is merely illustrative of the operation of a preferred embodiment, and that further selection relays, each representing an additional subcriber to be selected by an additional input pulse in an incoming pulse train of the selection signal could be included in the selection circuit 30 of the apparatus A in a like manner to the selection relays 31, 32 and 33 expanding the capacity of the apparatus A of the present invention.

The ground conductor 51 (FIG. 2) in the tone generator circuit 50 (FIG. 2) is electrically connected to the ground conductor G when the contact 23*c* of the control relay 23 closes in the manner set forth hereinabove. A time control circuit 54, including a resistor 54*a* and a capacitor 54*b* receives current from the positive power supply conductor 85 when the ground conductor is connected to the ground conductor G. The current flowing through the resistor 54*a* and capacitor 54*b* charges the capacitor 54*b* to a sufficient potential to energize a control transistor 53 in the tone generator circuit 50. When the transistor 53 is energized, a relay 52 receives current flowing from the positive power supply conductor 85 through the relay 52, the transistor 53 and an emitter resistor 53*a*. When the relay 52 receives electrical current, the contact 52*a* (FIG. 3) a contact 52*b* (FIG. 3) a contact 52*c* and a contact 52*d* (FIG. 2) move to an alternate position from that illustrated in the accompanying drawings, providing ringing signals to the calling and called parties.

The contact 52*c* connects a resistor 54*c* in a parallel circuit arrangement with the charged capacitor 54*b*, and the charge on the charge capacitor 54*b* drains to the ground conductor 51 through the resistor 54*c* when the relay 52 is energized. When the charge on the capacitor 54*b* drains through the resistor 54*c*, the potential drop across such elements decreases and the transistor 53 will return to cut off, preventing the flow of current through the relay 52 and returning the contacts 52*a*, 52*b*, 52*c* and 52*d* of the relay 52 to the position illustrated in the accompanying drawings.

The resistance of the resistor 54*a* and the capacitance of the capacitor 54*b* are chosen to establish a predetermined time constant, setting the time which must pass before the transistor 53 is energized. Such time is the time which elapses before the relay 52 receives current to allow the calling and called parties to receive a ringing signal.

The resistance value of the resistor 54*c* is selected at a predetermined value to establish the time that the transistor 53 is energized and allows the current to flow through the relay 52. The amount of time that the relay 52 receives current determines the duration of the ring signal furnished by the tone generator circuit 50, while the time relay 52 is not receiving current is the duration of the pause between rings in the ring signal.

A ring coil 61 (FIG. 3) receives an alternating current signal from an additional secondary coil 84 (FIG. 4) in the power supply circuit 80 (FIG. 2) over a pair of output terminals 84*a* and 84*b* of the coil 84. The connections to ring coil 61 (FIG. 3) from coil 84 (FIG. 4) are conventional and are not shown in the drawings. When the predetermined time established by the time control circuit elapses, and the relay 52 (FIG. 2) is energized, the ring coil 61 (FIG. 3) is electrically connected to the pre-selected telephone instruments 101 through 103 of the party to the call over the following circuit: the ring coil 61, capacitors 62*a* and 62*b*, the conductor 92, the closed contact 52*a*, the conductors 93*c* and 93*a*, and the closed contact 31*c*, 32*c* or 33*c*, furnishing a ringing signal to the predetermined called party over such circuit.

The ringing signal from the ring coil 61 is electrically connected between the input conductors 91 and 92 over the following circuit: input conductor 91, ground conductor G, ring coil 61, resistor 63*a*, capacitor 63*b*, closed contact 52*b*, and electrical conductors 92and 64 (FIG. 4) closed contact 23*b* (FIG. 4), conductor 92*d*, and input conductor (FIG. 2) 92, to furnish the ringing signal to the incoming caller over the input conductors 91 and 92.

When the predetermined time period established by the time control circuit 54 (FIG. 2) has elapsed with the relays 31 through 33 having received no incoming selection pulses, the contacts 31*d*, 32*d*, and 33*d* of such relays remain in the position illustrated in the accompanying drawings, and electrically connect the telephone instrument 104 (FIG. 2) as a main or primary telephone of the party line to the ringing coil 61 through the conductors 93*a*, 93*c*, closed contact 52*a*, conductor 92, capacitor 62*a* and 62*b*, furnishing the ringing signal to the main or primary telephone 104. Thus, upon passage of the predetermined time established by the time control circuit 54 (FIG. 2) in the absence of an input selection signal, the telephone instrument 104 (FIG. 3) of the primary preselected party of the party line is electrically connected to the input conductors 91 and 92.

When the predetermined called party answers his telephone in response to the ringing signal by lifting the receiver from the hook, an electrical circuit is formed between the positive power supply conductor 85 (FIG. 3) and the ground conductor G over the following path: resistor 65*a*, diode 65*b*, resistor 65*c*, conductor 93*a*, closed contacts 31*c*, 32*c* or 33*c*, and the lifted receiver of telephone set 101, 102 or 103 depending on the called party, and the contact 71*c* to the ground conductor G. In the event that the main predetermined called party is to be connected to the incoming call, the telephone set 104 is electrically connected between the ground conductor G and the resistor 65*c* over the circuit including the conductor 93*a*, the contacts 31*d*, 32*d* and 33*d*, the telephone set 104, the contact 71*c* and the ground conductor G.

When the called party answers, the current through the resistor 65*a* energizes the base of the transistor 66, allowing current to flow through the resistor 66*a* and 66*b*. A portion of such current flows through an output diode 66*c* and a resistor 67*a* to bias a transistor 67 into conduction. The transistor 67 upon conducting, permits current to flow through a collector resistor 67*b* and the transistor 67 to the ground conductor G establishing a substantially ground potential at the collector of the transistor 67.

A bypass diode 24*d* (FIG. 4) of the control circuit bypasses the resistor 24*c* and the base of the transistor 22 (FIG. 4) and permits the current from the resistor 24*b* to pass through the diode 24*d* to the substantially ground potential formed at the collector of the transistor 67 (FIG. 2) as set forth above, when the called party answers. Such current through diode 24*d* (FIG. 4) passes over a conductor 67*c*, biasing the transistor 22 into cut off, preventing further current from flowing through the control relay 23 in the control circuit 20 (FIG. 2). When current ceases to flow through the relay 23, the contacts 23*a*, 23*b* and 23*c* thereof move to the position illustrated in the accompanying drawings. The open contact 23*c* disconnects the control circuit 10 (FIG. 2) and the tone generator 50 from the ground conductor G preventing further ringing signals from being furnished from the apparatus A to the called party. The open contact 23*b* (FIG. 4) prevents ringing signals from being furnished to the input conductor 92 over the conductor 92d.

During the interval that the predetermined called party is receiving the ringing signal from the ring coil 61 (FIG. 3), the remaining parties to the party line do not receive such ringing signal, since the respective contacts of the selection relays controlling their telephone sets do not close and receive the ringing signal through the conductors 93*a* and 93*b*, as the case may be.

The apparatus A of the present invention prevents the remaining parties to the party line from eavesdropping or otherwise interfering with the completed call to the predetermined called party, providing secrecy and preventing interference with the called party's call. Should a party other than the predetermined called party, for example the party having telephone set 101, lift the receiver of his telephone while a call is in progress to such called party, the ring coil 61 will furnish an alternating current buzz, or busy signal, to such party lifting the telephone over the following circuit: ground conductor G, ring coil 61, a resistor 61*a*, a capacitor 61*b*, the closed contact 71*b*, the contact 31*c*, telephone set 101 and closed contact 71*c*.

A control transistor 13 (FIG. 2) receives a positive bias potential at its base over the following circuit path: positive power supply conductor 85, resistor 67*b* (FIG. 3), conductor 67*c*, and input resistor 13*a* (FIG. 2), a diode 13*b*, and a biasing capacitor 13*c* which electrically connects the diode 13*b* to the ground conductor G. A current limiting resistor 13*d* is connected between the diode 13*b* and the base terminal of the transistor 13 to limit the input current to the transistor 13. A limiting diode 14 electrically connects the emitter terminal of the transistor 13 to an electrical conductor 68, and a resistor 13*e* connects the conductor 68 to the ground conductor G to provide a bias potential for the emitter of the transistor 13.

A collector conductor 13*f* electrically connects the collector of the transistor 13 to the selection relay 31 through the contacts 31*b*, 32*b* and 33*b*. When the selection relay 31 is receiving current, as has been set forth hereinabove, the contact 31*b* thereof moves to an opposite position from that illustrated and electrically connects the collector of the transistor 13 to the selection relay 32. In a like manner, when the selection relay 32 receives electrical current, the contact 32*b* moves to an opposite position, and electrically connects the collector of the transistor 13 to the relay 33. Further, when the relay 33 receives current, the contact 33*b* thereof moves to an opposite position from that illustrated and disconnects the collector of the transistor 13 from the selector relays 31 through 33.

When a party to the party line desires to place an outgoing call, for example the party at telephone set 102 (FIG. 3), the receiver of the telephone set is lifted, energizing the selection relay 31 (FIG. 2) over the following circuit path: relay coil 31, contact 31*b*, contact 32*b*, contact 33*b*, conductor 13*f*, transistor 13, diode 14, conductor 68, contact 71*b* (FIG. 3), contact 32*c*, telephone set 102, contact 71*c*, and ground conductor G. The relay 31 (FIG. 2) moves its contacts 31*a*, 31*b*, 31*c* (FIG. 3), and 31*d* to an opposite position from that shown in the accompanying drawings after the passage of sufficient current to overcome the threshold voltage of the diode. 14 (FIG. 3). The contact 31*c* (FIG. 3) connects the telephone set 101 to the conductor 93*b*, testing to see if the telephone set 101 is desiring the outgoing call. If this is not the case, the telephone set 101 does not pass current from the positive power supply conductor 85 through the transistor 66, the diode 65*b*, the resistor 65*c*, the conductors 93*a* and 93*b* to the ground conductor G. The contact 31*b* (FIG. 2) of the relay 31 electrically connects the relay 32 through the transistor 13 to the ground conductor G, and disconnects the relay 31 from the transistor 13.

The contacts 32*a*, 32*b*, 32*c*, (FIG. 3) and 32*d* of the relay 32 (FIG. 2) move to an opposite position from that illustrated in the accompanying drawings when the relay 32 receives sufficient current to overcome the threshold voltage of the diode 14. When the telephone set 102 (FIG. 3) is the set of the subscriber desiring an outgoing call, the contact 32*c* electrically connects the positive power supply conductor 85 to the ground conductor G over the following circuit path: resistor 65*a*, diode 65*b*, resistor 65*c*, conductor 93*a*, conductor 93*b*, closed contact 32*c*, telephone set 102, contact 71*c*, and ground conductor G. Such current through the resistor 65*a* is sufficient to bias the transistor 66 into conduction, which in turn biases the transistor 67 into conduction, in the manner previously set forth hereinabove. The collector of the transistor 67 assumes a substantially ground potential when the transistor 67 conducts, and consequently the conductor 67*c* is at such substantially ground potential, biasing the transistor 13 (FIG. 2) into cut off, and preventing the flow of current through the relay 33 and transistor 13 to the ground conductor G The relay 32 is held in a latched position over the following circuit path: relay 32, contact 32*a*, resistor 34, diode 17, conductor 67*c*, transistor 67 (FIG. 3) and ground conductor G. The contact 32*c* of the relay 32 thus remains in an energized position opposite that shown in the accompanying drawings, and electrically connects the telephone set 102 to the incoming telephone lines 91 and 92 over the following circuit path: conductor 91, ground conductor G, contact 71*c*, telephone instrument 102, contact 32*c*, conductor 93*b*, conductor 93*a*, conductor 93*c*, contact 52*a* and conductor 92. The party using the telephone set 102 then receives the incoming dial tone over the conductors 91 and 92 from the central telephone exchange in the well known manner and signifies the party wishes to call by indicating his selection signal in the well known manner, i.e., dial pulses or key actuated selected frequency tones.

While the party is dialing his out-going call, and during the progress of such outgoing call, the other parties are prevented from interfering with the call by attempting to dial an outgoing call or attempting to speak into the telephone receiver of their respective telephone instruments.

The transistor 13 (FIG. 2) is maintained cut off by the conducting transistor 67 (FIG. 3, preventing the contacts of the selection relays from connecting the instruments of such other parties to the incoming lines 91 and 92. The contact 31*d*, 32*d* or 33*d* as the case may be of the relay of the calling party is in an energized position preventing the telephone set 104 from being connected to the incoming telephone lines.

In the event that a party to the party line attempts to eavesdrop or listen in on the telephone call by the party receiving exclusive line service, the receiver of the telephone sets of the other parties will receive only the busy signal from the ring coil 61 over the resistor 61*a*, the capacitor 61*b*, the contact 71*b*, or the capacitor 61*c* in the case of telephone instrument 104, and thereby be prevented from interfering with or eavesdropping on a telephone call to the party being furnished by exclusive line service by the apparatus A of the present invention.

In the operation of the present invention, an incoming call from a caller desiring to speak to a predetermined one of the parties served by the apparatus A of the present invention is directed through a telephone exchange in the standard, well known manner, and a ringing signal is furnished to the apparatus A from the telephone lines over the incoming conductors 91 and 92. Such ringing signal energizes the line receiver circuit 20 (FIGS. 1 and 4) and the time delay circuit 10

(FIGS. 1 and 4) of the control circuit of the apparatus A. The incoming caller thereupon dials the predetermined selection signal designating the party served by the apparatus A with whom he desires to speak. In the event that the party served by the telephone instrument 104 (FIG. 3) is the desired party, the incoming caller merely waits until the predetermined time established by the time control circuit 54 (FIG. 2) in the tone generator 50 passes, whereupon the telephone instrument 104 (FIG. 3) receives a ringing signal from the ring coil 61. The incoming caller dials one, two or three pulses as the selection signal when the party served by the telephone instrument 101, 102 or 103, respectively, is the predetermined party with whom he wishes to speak.

When the called party answers, the transistor 66 begins conducting, energizing the transistor 67 and preventing the transistor 13 (FIG. 2) from operating, thereby preventing parties other than the called party from interfering with the completed call to the predetermined called party. Furthermore, should a party to the party line other than the predetermined called party lift his receiver, the ring coil 61 (FIG. 3) will furnish such receiver with a busy signal and provide secrecy and protection against eavesdropping and other interference with the completed call by parties other than the predetermined called party.

When a party to the party line desires to make an outgoing call, he is notified by the busy signal provided by the ring coil 61 if the party line is already in use, as has previously been set forth hereinabove. Should the party line not be in use, the party desiring to make an outgoing call is connected to the input terminals 91 and 92, as has been previously set forth, and through such conductors is connected to the telephone exchange, where his telephone call will be processed in the known manner to call the party with whom he wishes to speak. When the outgoing calling party is electrically connected to the input conductors 91 and 92, other parties to the party line are electrically connected to the ring coil 61 in order that should such other parties lift the receiver of the telephone set, they will receive a busy signal, notifying them that the party line is in use.

The foregoing disclosure and description of the invention are illustrative and explanatory thereof, and various changes in the size, shape, materials, wiring connections and contacts as well as in the details of the illustrated circuitry and construction may be made without departing from the spirit of the invention.

I claim:

1. An apparatus for converting telephone party line service into exclusive line service by connecting the telephone of a predetermined party to an incoming call for such party and excluding other parties of the party line from such call, comprising:

a. selection means responsive to a selection signal in the incoming call for connecting the incoming call to the telephone of a predetermined call party;
b. tone generator means for signalling the telephone of the predetermined party of the presence of the incoming call;
c. privacy means for excluding the other parties of the party line from the call to the predetermined party, wherein telephone calls to predetermined called parties of the party line service are protected from interference by other parties; and
d. monitor means for receiving a test signal from the telephone exchange, said monitor means returning the apparatus to a party line arrangement in response to said test signal whereby the apparatus is compatible with testing equipment in the telephone exchange.

2. The structure of claim 1 further including control means responsive to an incoming ringing signal for activating the apparatus.

3. The structure of claim 2, wherein said control means comprises:

means for connecting the output of said tone generator means to the incoming call wherein the calling party may hear the signals to the telephone of the called party.

4. The structure of claim 2, wherein said control means comprises:

means for providing a return current after receipt of the incoming call to control switching equipment at the telephone exchange.

5. The structure of claim 1, wherein said selection means comprises:

means for reshaping the pulses of the selection signal, whereupon the apparatus is protected from noise and static present on telephone lines.

6. The structure of claim 1, wherein said privacy means comprises:

means for preventing the telephones of other parties from receiving the signal from said tone generator means, wherein only the telephone of the called party receives the signal of the presence of an incoming call.

7. The structure of claim 1, wherein said privacy means comprises:

means for providing a busy signal to other parties during a call to the predetermined party wherein other parties are notified that a call is in progress on the party line.

8. The structure of claim 1, further including:

a. power supply means for energizing the apparatus; and
b. means for returning the telephones to party line service in response to a failure of said power supply means.

9. The structure of claim 1 wherein said selection means comprises:

primary means responsive to the absence of a selection signal for connecting the incoming call to a primary preselected party on the party line.

10. The structure of claim 9 wherein said selection means comprises:

time control means for controlling the duration of time for reception of the selection signal, said time control means energizing said primary means.

11. A telephone secrecy apparatus preventing eavesdropping with a telephone call to a predetermined called party, comprising:

a. selection means responsive to a selection signal in the incoming call for connecting the incoming call to the telephone of a predetermined called party;
b. tone generator means for signalling the telephone of the predetermined party of the presence of the incoming call;
c. privacy means for excluding the other parties of the party line from the call to the predetermined party, wherein telephone calls to predetermined called parties of the party line service are protected from eavesdropping by other parties; and d. monitor means for receiving a test signal from the telephone exchange, said monitor means returning the apparatus to a party line arrangement in response to said test signal whereby the apparatus is compatible with testing equipment in the telephone exchange.

* * * * *